US006401346B1

(12) United States Patent
Roberts

(10) Patent No.: US 6,401,346 B1
(45) Date of Patent: Jun. 11, 2002

(54) POWER COPING BAND SAW

(76) Inventor: Russell Brett Roberts, 4821 Maryland Ave., Birmingham, AL (US) 35210

( * ) Notice: Subject to any disclaimer, the term of this patent is extended or adjusted under 35 U.S.C. 154(b) by 0 days.

(21) Appl. No.: 09/722,229

(22) Filed: Nov. 24, 2000

Related U.S. Application Data

(60) Provisional application No. 60/167,287, filed on Nov. 24, 1999.

(51) Int. Cl.[7] .............................................. B23D 53/12

(52) U.S. Cl. ...................................... 30/380; 30/DIG. 1

(58) Field of Search ............................ 30/380, DIG. 1; 83/661

(56) References Cited

U.S. PATENT DOCUMENTS

| | | | | | |
|---|---|---|---|---|---|
| 1,303,809 A | * | 5/1919 | Lofgren | ....................... | 30/380 |
| 3,621,894 A | | 11/1971 | Niksich | .................... | 143/21 A |
| 4,949,464 A | | 8/1990 | Adomatis | .................... | 30/509 |
| 5,363,558 A | | 11/1994 | Schroeder | ..................... | 30/380 |
| 5,369,887 A | | 12/1994 | Keevers | ....................... | 30/394 |
| 5,388,334 A | * | 2/1995 | Halsey | ........................ | 30/380 |

* cited by examiner

*Primary Examiner*—Douglas D. Watts
(74) *Attorney, Agent, or Firm*—Wm. Randall May

(57) ABSTRACT

A lightweight, hand-held, egonomically designed and balanced, electric powered, band-type, coping saw is disclosed. The device includes a handle for housing, controlling and providing power to a variable speed electric motor. The motor operates a gear drive which propels a sprocketed band blade or abrasive cable around and through a pulley system situated within a specially designed U-shaped uniframe attached to the handle. The motor is powered by a detachable and rechargeable battery or by alternating current.

10 Claims, 3 Drawing Sheets

POWER COPING BAND SAW

This application claims benefit of provisional No. 60/167,287 filed Nov. 24, 1999.

BACKGROUND OF THE INVENTION

This invention relates generally to hand tools for cutting or sawing. More specifically, the present invention relates to a particular type of handsaw known as a "coping saw". Coping saws have been in existence for many years and are used primarily by carpenters and other craftsmen for manually cutting curves or angles in wood or other material to create a coped appearance. Coping saws are especially useful in cutting and fitting the crown molding, cove molding and base molding used in many homes and commercial buildings. A typical coping saw is hand operated and has a very narrow linear saw blade which is held, under tension, within a U-shaped frame. Prior art coping saws are similar to hacksaws or fretsaws in that their linear blades must be supported at both ends for proper use. As in most saws, the teeth of a coping saw blade generally have only one sharp edge and will therefore cut in only one direction—typically on the "pull" stroke.

Because of the inherent design and configuration required and necessary for the proper use of a coping saw, it has been difficult, heretofore, to create a useful and effective power driven coping saw. Attempts have been made to produce power driven "reciprocating" coping saws such as the ones disclosed in Keevers, U.S. Pat. No. 5,369,887 and Adomatis, U.S. Pat. No. 4,949,464. However, due to the reciprocating action of the blades, these devices have been only marginally more effective or efficient than manual coping saws. These devices have also been known to bind within the material being cut and merely vibrate back and forth instead of actually cutting or sawing.

Attempts have also been made to produce portable, power driven saws which utilize a continuous or endless blade such as the ones disclosed in Niksich, U.S. Pat. No. 3,621,894 and Schroeder, U.S. Pat. No. 5,363,558. These devices, however, are designed to use a spiral or cylinder-type blade and not the flat and narrow linear blade desired by most craftsmen for use as a coping saw. The Niksich reference discloses a hand held, belt-driven, saw-type power tool wherein the belt and spiral blade travel together around the grooved edge of a C-shaped body. The Schroeder reference discloses a cordless, belt-driven, coping saw having a large U-shaped frame for use with a cylinder-type blade.

The present invention is a modification and significant improvement over prior art, particularly the Schroeder reference, and incorporates unique and novel design features which distinguish the invention over the existing art.

SUMMARY OF THE INVENTION

In view of the foregoing, it is a primary object of this invention to provide a lightweight, ergonomically designed and balanced, hand-held, electric or battery-powered, band-type coping saw, the design and construction of which allows the efficient use of both linear and cylindrical-type band blades.

According to an embodiment of the invention, a powered hand-held coping band saw comprises a balanced, ergonomically designed, handle for housing and controlling a small, but powerful, variable-speed electric motor. The motor operates a gear drive which propels a sprocketed band blade or abrasive cable around and through a specially designed pulley system within a U-shaped uniframe attached to said handle.

An advantage of the present invention is the provision of a powered band-type coping saw having a driving mechanism which allows the blade to be easily and efficiently propelled around and through its U-shaped uniframe in one continuous direction with virtually no vibration.

Another advantage of the present invention is the provision of a powered band-type coping saw having a detachable rechargeable battery pack for portability and extended use.

Another advantage of the present invention is the provision of a powered band-type coping saw having design features that make the device easily maneuverable thereby increasing the effectiveness of the device and thus the efficiency of its user.

Another advantage of the present invention is the provision of a powered band-type coping saw the design of which allows a craftsman or other user of the saw to cut quickly, accurately and at the desired angle.

Another advantage of the present invention resides in the unique and simplistic design of its blade driving mechanism and pulley system.

A further advantage of the present invention is the provision of a powered band-type coping saw the design of which not only allows for the use of linear band blades for coping wooden materials but also allows for the use of abrasive cables for cutting plastic or metallic materials such as conduit or rebar.

A further advantage of the present invention resides in the compact, lightweight unicast housing and frame of the device.

A further advantage of the present invention is the provision of a powered, band-type, coping saw which provides for continuous "pull stroke" operation and which meets and exceeds all safety requirements.

A final advantage of the present invention resides in the easy access to, and the ease of installation and replacement of, the band blade or abrasive cable.

BRIEF DESCRIPTION OF THE DRAWINGS

The foregoing and other objects, features, and advantages of the present invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
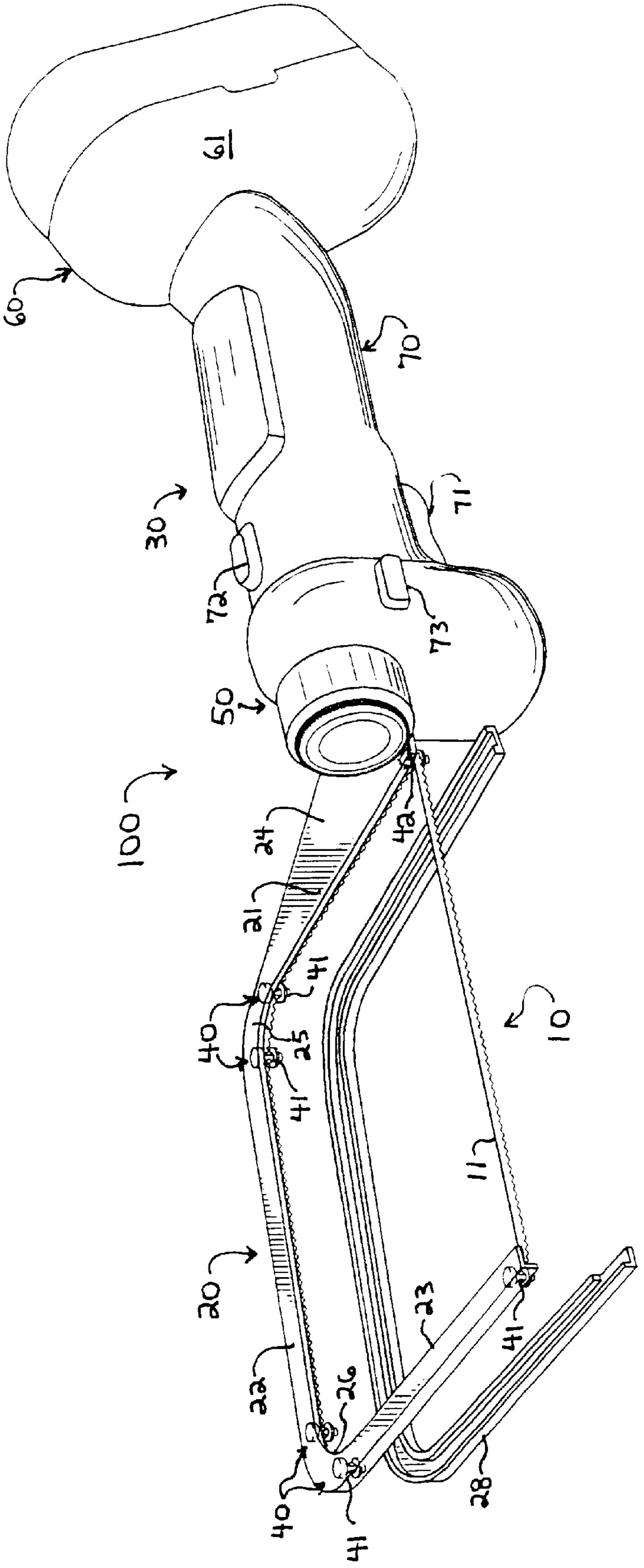
FIG. 1 is a perspective view of a preferred embodiment of the invention shown with blade cover detached.

In accordance with an embodiment of the invention, FIG. 1 shows a powered band-type coping saw 100 comprising a continuous band cutting means 10 mounted to a U-shaped frame member 20 attached to a control means 30. The U-shaped frame member 20 includes a pulley system 40 for driving and guiding the cutting means 10 around and through the U-shaped frame member 20 during operation of the device 100. The control means 30 incorporates and houses a drive means 50 and a power means 60 and includes a handle portion 70 for safely operating and controlling the device 100.

Figure 2:
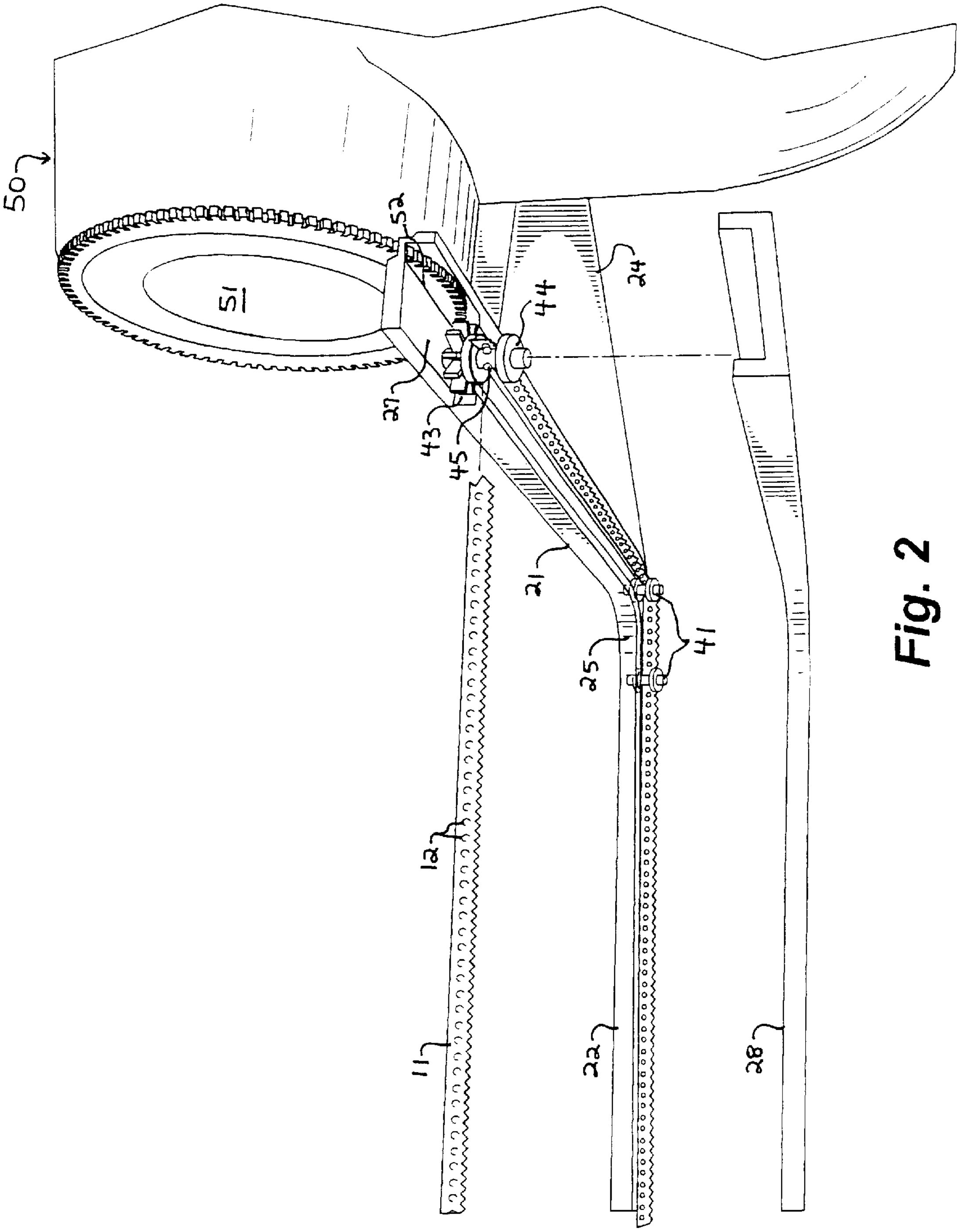
FIG. 2 is an exploded view of the drive mechanism of the embodiment of FIG. 1.
Figure 3:
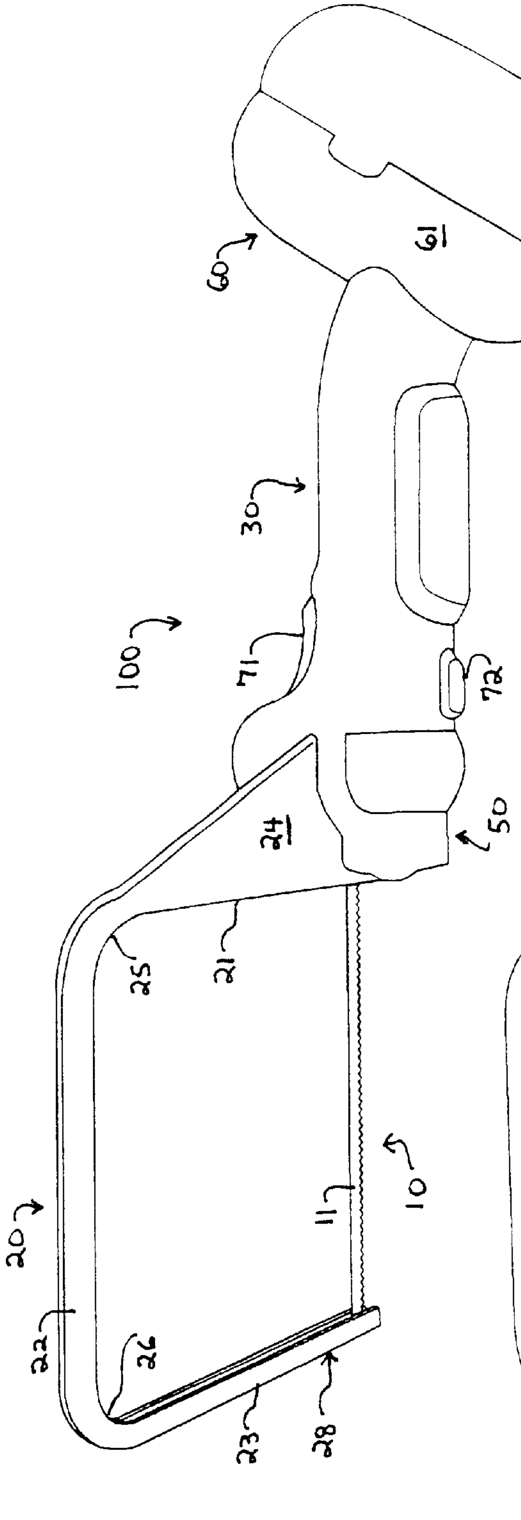
FIG. 3 is a perspective, reverse angle view of the embodiment of FIG. 1.
Figure 4:
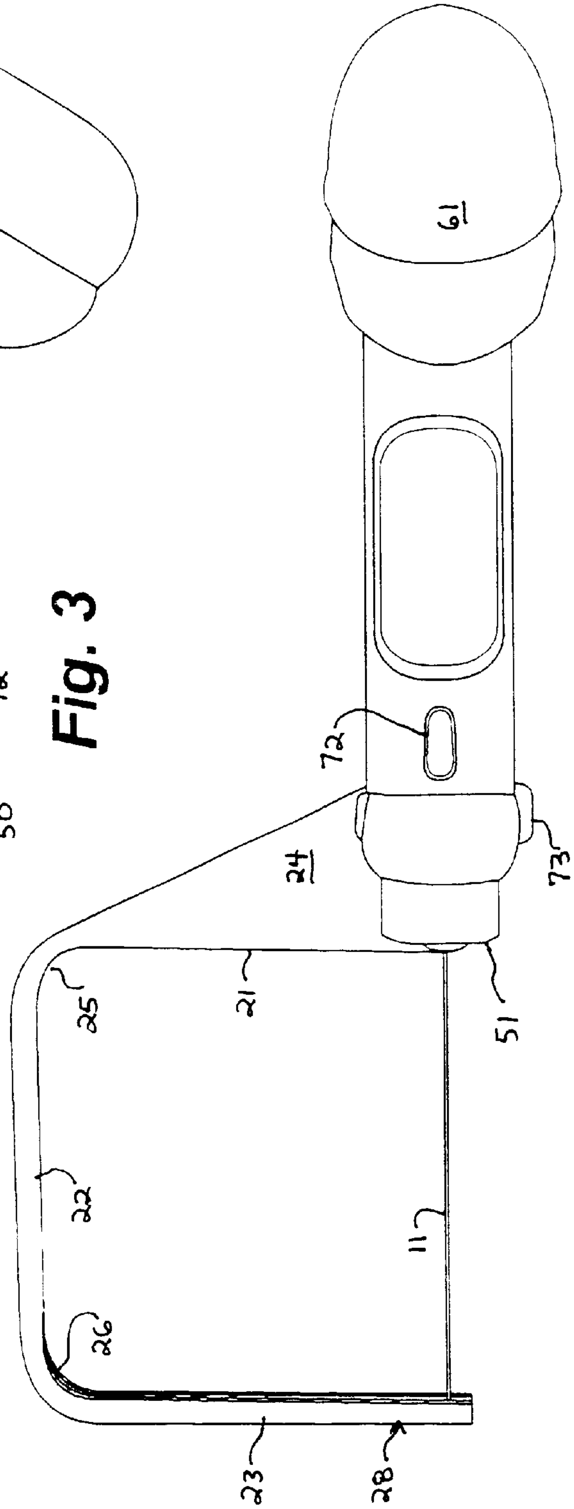
FIG. 4 is a plan view of the embodiment of FIG. 1.

In a preferred embodiment of the device 100, the U-shaped frame member 20 is rigidly attached to the control means 30 at or near the drive means 50 and comprises a first leg portion 21, a second leg portion 22 and a third leg portion 23. The frame member 20, as best shown in FIGS. 1 and 2, is of solid, singular construction having a generally "L"-shaped cross-section. The "L"-shaped cross-sectional design of the U-shaped frame member 20 provides for the formation of a channel or mounting surface 27 upon which the pulley system 40 of said frame member 20 is attached. Said frame member 20 is made of durable, yet resilient, material such as stainless steel or cast aluminum or other similar material capable of withstanding slight repetitive flexing without permanent deformation. As best shown in FIGS. 3 and 4, the first leg portion 21 of said frame member 20 includes a mounting portion or "foot" member 24 extending laterally therefrom for attachment of the frame member 20 to the control means 30 and for structural support and added stability of said frame member 20 during operation. Inherent to the U-shaped design of the frame member 20 is a pair of 90° bends with a first 90° bend 25 being situated between the first leg portion 21 and the second leg portion 22 and a second 90° bend 26 being situated between the second leg portion 22 and the third leg 23 portion. A snap on frame cover 28 is also provided which houses and protects the pulley system 40 of said frame member 20 and provides added safety during use.

The pulley system 40 of the present invention comprises a plurality of guide pulleys 41 and one drive pulley 42 spaceably attached to the mounting surface 27 of said frame member 20 as shown. A pair of guide pulleys 41 are mounted on either side of each 90° bend 25 & 26 of said frame member 20. Another guide pulley 41 is mounted at the end of the third leg portion 23 of the frame member 20. As best shown in FIG. 2, the drive pulley 42 is mounted near the end of the first leg portion 21 of frame member 20 and comprises a drive sprocket 43 and a "tit" sprocket 44. The drive pulley 42 is positioned on and adjacent to the mounting surface 27 of the frame member 20 so as to allow the drive sprocket 43 to engage the drive means 50 of the control means 30. The tit sprocket 44 of said drive pulley 42 is situated just beneath the drive sprocket 43 and comprises a plurality of "tits" or hemispheric nodules 45 spaceably positioned around the axis of said tit sprocket 44 for engaging and propelling the cutting means 10 around and through the pulley system 40.

The cutting means 10 of the present embodiment comprises a continuous or endless linear coping saw blade 11 rotationally mounted within said frame member 20 around and about the guide pulleys 41 and drive pulley 42 of the pulley system 40 and extending across the opening of said U-shaped frame member 20. The blade 11 of said cutting means 10 further comprises concave hemispheric indentions or dimples 12 spaceably positioned along the top interior edge of said blade 11. Said dimples 12 are spaced to engage the nodules 45 of the tit sprocket 44 of said drive pulley 42 and, when the drive pulley 42 is engaged by the drive means 50, provides the driving force for propelling the blade 11 around and through the pulley system 40 of the frame means 20. Said nodules 45 also assist in maintaining the upright positioning of the blade 11 throughout the pulley system 40 during operation. Said blade 11 is easily installed by removing the frame cover 28 of the frame member 20 and then by threading the blade 11 first around the drive pulley 42 and then around the guide pulleys 41 on either side of the 90° bends 25 & 26 of the frame member 20. The blade 11 is then positioned around the remaining guide pulley 41 located at the end of the third leg portion of the frame member 20 by slightly flexing the frame member 20. Other continuous or endless-type band blades such as abrasive cables, spiral blades or cylinder blades may also be effectively used with the present invention.

The drive means 50 of the present embodiment is mounted at one end of the control means 30 and comprises a shaft-driven gear drive 51 powered and controlled by a variable speed electric motor (not shown). The gear drive 51 is mounted adjacent to the frame member 20 and protrudes slightly through a slot 52 near the end of the first leg portion 21 of the frame member 20 so as to directly engage the drive sprocket 43 of the drive pulley 42.

The power means 60 of the present embodiment provides power to the variable speed electric motor of the drive means 50 and comprises a detachable 12 to 16 volt rechargeable battery (battery not shown) disposed within a compartment 61 attached to the handle portion 70 of the device 100. The compartment 61 is slightly angled away from the handle portion 70 for added balance and stability. The power means 60 also includes an optional power cord (not shown) for connection to an alternating current source.

The handle portion 70 of the control means 30 is ergonomically designed for ease of use and maximum tool efficiency and includes a variable speed trigger 71, a forward and reverse switch 72 and a safety switch 73 for controlling the flow of electricity to, and the operation of, the drive means 50.

While the invention has been particularly shown and described with reference to the preferred embodiment thereof, it will be understood by those skilled in the art that various alterations in form, detail and construction may be made therein without departing from the spirit and scope of the invention.

The embodiments of the invention in which an exclusive property right or privilege is claimed are defined as follows:

1. A powered band-type coping saw comprising:

a continuous band coping saw blade having a plurality of concave hemispheric indentions spaceably positioned along the entire top portion of one side of said blade;

a uni-cast or uni-body housing comprising an ergonomically designed handle portion and a U-shaped frame portion extending laterally from said handle portion with said frame portion having an L-shaped cross-section so as to form a channel along its entire length, said frame portion also having a snap-on frame cover for protection and added safety during coping operations;

a pulley system attached to said U-shaped frame for holding and guiding said coping saw blade around and through the channel formed by said frame, said pulley system comprising a plurality of guide pulleys and a double-sprocketed drive pulley with said drive pulley comprising a gear drive sprocket and a blade drive sprocket, said blade drive sprocket having a plurality of hemispheric nodules positioned around the circumference of its axle for mechanically engaging the concave indentations along said continuous band coping saw blade;

a drive means comprising a shaft-driven gear drive attached to a motor means with said gear drive being rotatably mounted to said motor means at one end of said handle portion of said uni-body housing and adjacent to said U-shaped frame so as to mechanically engage the gear drive sprocket of said double-sprocketed drive pulley;

a detachable power means attached at the end of said handle portion of said uni-body housing opposite said drive means for providing power to said motor means; and, ergonomically placed control mechanisms along the handle portion of said uni-body housing for controlling and operating said motor means.

2. The apparatus of claim 1, wherein said guide pulleys are positioned about said U-shaped frame so as to provide minimal fiction to said cutting means as it is propelled through said pulley system.

3. The apparatus of claim 1, wherein said power means comprises a rechargeable battery pack which is disposed within a compartment attached to said handle portion of said uni-body housing, said compartment being angled slightly upwards with respect to said handle portion for additional balance, stability and user comfort during the coping process.

4. The apparatus of claim 1, wherein said continuous band coping saw blade is positioned onto said pulley system by slightly flexing the U-shaped frame portion of said uni-body housing and wherein said U-shaped frame is made of durable, yet resilient, material such as stainless steel or cast aluminum or other similar material capable of withstanding slight repetitive flexing without permanent deformation.

5. The apparatus of claim 1, wherein said control mechanisms comprise a variable speed trigger, a forward and reverse switch and a safety kill switch, said variable speed trigger being ergonomically positioned on said handle portion so as to provide the greatest possible comfort and control during use.

6. The apparatus of claim 1, wherein said handle portion of said uni-body housing is contoured to accommodate the shape and form of the human hand thereby providing greater comfort to the user and greatly reducing muscle strain and exhaustion during use.

7. A powered band-type coping saw comprising:

an ergonomically designed uni-cast or uni-body housing having a handle portion and a U-shaped frame portion with said frame portion extending laterally and homogeneously from said handle portion and having an L-shaped cross-section so as to form a continuous channel along said frame, said frame further comprising a mounting surface along and within said channel;

a continuous band coping saw blade having a plurality of hemispheric indentions spaceably positioned along the entire top portion of one side of said blade;

a pulley system comprising a plurality of guide pulleys and a double-sprocketed drive pulley is attached to the mounting surface of said U-shaped frame so as to form a closed rotational system for operably receiving the continuous band coping blade;

said double-sprocketed drive pulley of said pulley system further comprising a gear drive sprocket and a blade drive sprocket with said blade drive sprocket having a plurality of hemispheric nodules positioned around the circumference of the drive sprocket axle so as to mechanically engage said continuous band coping blade;

a drive means housed within the handle portion of said uni-body housing comprising a shaft-driven gear drive attached to a motor means with said gear drive being rotatably mounted to said motor means at one end of said handle portion and positioned adjacent to said U-shaped frame so as to mechanically engage the gear drive sprocket of said double-sprocketed drive pulley;

a detachable power means disposed within a compartment attached to the handle portion of said uni-body housing opposite said drive means, said power means compartment being angled slightly upwards with respect to said handle portion for additional balance, stability and user comfort during the coping process; and, control mechanisms ergonomically positioned along the handle portion of said uni-body housing for controlling and operating said motor means and said continuous band coping saw, said control mechanisms comprising a variable speed trigger, a forward and reverse switch and a safety kill switch, said variable speed trigger being ergonomically positioned on the bottom side of said handle near the U-shaped frame so as to provide the greatest possible comfort and control during use.

8. The apparatus of claim 7, wherein said handle portion of said uni-body housing is contoured to accommodate the shape and form of the human hand thereby providing greater comfort to the user and greatly reducing muscle strain and exhaustion during use.

9. The apparatus of claim 7, wherein said continuous band coping saw blade is positioned onto said pulley system by slightly flexing the U-shaped frame portion of said uni-body housing and wherein said U-shaped frame is made of durable, yet resilient, material such as stainless steel or cast aluminum or other similar material capable of withstanding slight repetitive flexing without permanent deformation.

10. The apparatus of claim 7, wherein a friction fit frame cover is removeably attached to said U-shaped frame portion of said uni-body housing.

* * * * *